Sept. 1, 1931.  F. C. COSEO  1,821,424
TROLLEY HARP
Filed Jan. 21, 1930
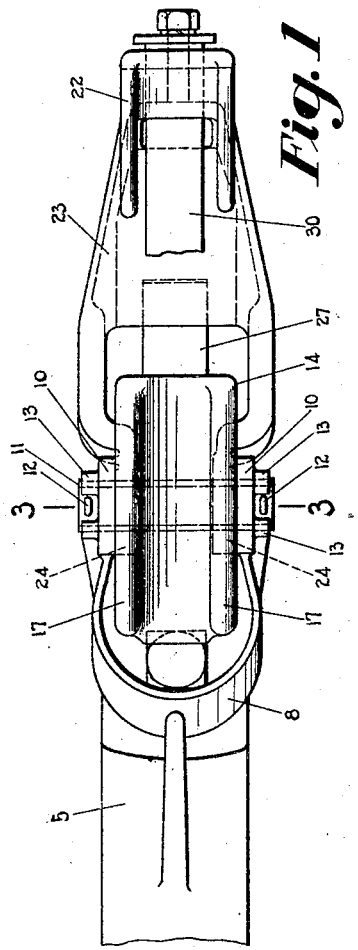
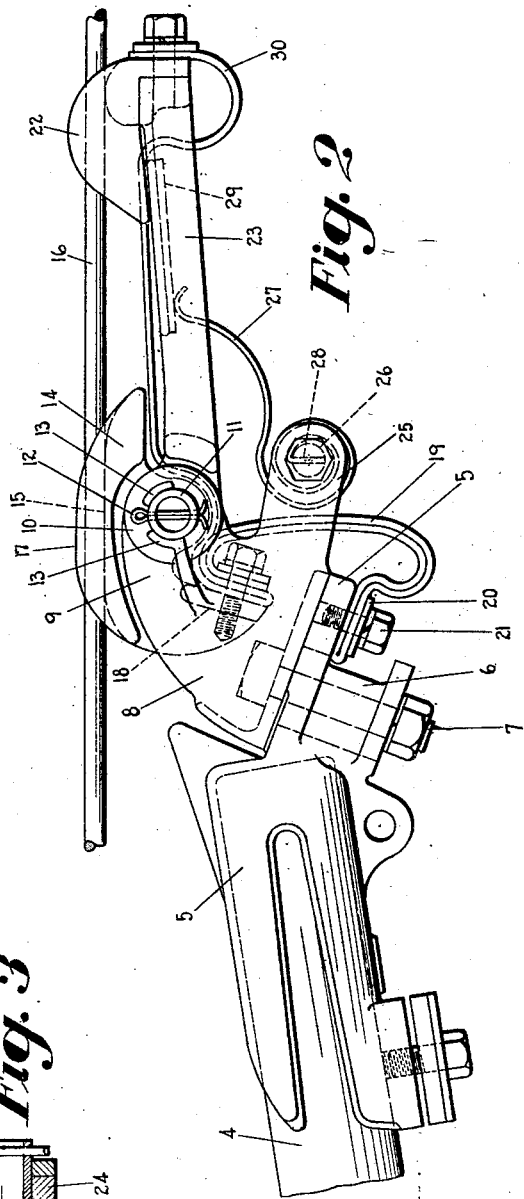
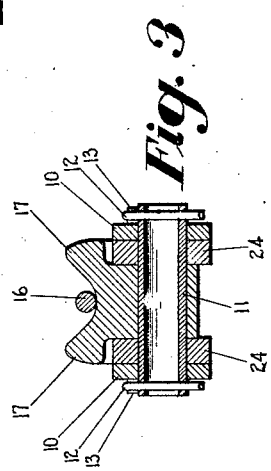

Patented Sept. 1, 1931

1,821,424

UNITED STATES PATENT OFFICE

FREDERICK C. COSEO, OF COLUMBUS, OHIO, ASSIGNOR TO THE JEFFREY MANUFACTURING COMPANY, OF COLUMBUS, OHIO, A CORPORATION OF OHIO

TROLLEY HARP

Application filed January 21, 1930. Serial No. 422,399.

The invention relates to trolley or overhead devices used on electric locomotives, cars, and the like, where a trolley wire or rod is used.

It has been found that where relatively high currents are employed to drive large motors, sliding contact shoes are more efficient and desirable than the ordinary trolley wheel.

The usual standard trolley harp and pole has proven unsatisfactory, due mostly to the tendency of the trolley shoe to break contact with the conducting wire or rod. This is especially true when the trolley shoe passes over connections and switches and around curves in the conducting wire or rod. When such contact is broken, there results an arcing, and intermittent surges of power, as the shoe bumps along the conducting wire or rod, thereby causing unusual strain upon and likelihood of injury to the electric motors.

It is one of the objects of my invention to prevent or minimize the accidental breaking of contact between the trolley shoe and trolley wire, thereby eliminating the attendant disadvantages.

Another object of my invention is to provide a trolley shoe which is capable of satisfactorily transmitting high voltage currents to the locomotive motors.

Still another object of my invention is to provide a trolley shoe which is simple in construction and cheap to manufacture.

With these and other objects and advantages in mind, attention is called to the drawings, in which:

Figure 1 is a plan view of the assembled trolley harp and shoe.

Figure 2 is an elevation of the assembled trolley harp and shoe, and

Figure 3 is a section along the line 3—3 of Figure 1.

Referring specifically to the drawings, in which like numbers indicate like parts, there is provided the trolley pole 4 of usual design having a spring at its base, (not shown) in order that there will alwayse be an upward pressure exerted thereon to force the trolley shoe against the trolley wire or rod. A casting 5 is secured to the upper end of the trolley pole in any suitable manner, and is provided with a bearing member 6. A trolley harp 8 is rotatably mounted upon the bearing member, and is held thereon by the bolt 7, provided with a nut at its lower end. The trolley harp comprises brackets 9 provided with bosses 10, each of which has an aperture therein, around which are cast semi-circular projections 13. Extending through the apertures is a sleeve 11, adapted at each end to receive cotter pins 12, which are held from turning by the projections 13, thereby preventing rotation of the sleeve 11.

A trolley shoe 14 is mounted for limited movement on the sleeve 11, and comprises a substantially longitudinally flat surface 15 provided with flanges 17 on both sides to minimize any possible displacement of the shoe from the trolley wire 16. A flexible connection 19 is secured at one end to a lug 18 on the shoe 14, and at the other end to the casting 5 by means of a clamping plate 20 and screw 21. Through this flexible wire 19, the electric current is transmitted from the trolley shoe to the power units through wires (not shown) from the casting 5.

A second or follower shoe 22 is provided with arms 23 having bosses 24, which are rotatably mounted on the sleeve 11. At the lower front end of the trolley harp 8 is a lateral extension 25, through which extends a slotted pin 26. A spring 27 has one end 28 inserted in the slotted pin 26, and the other end exerts pressure against an insulating block 29, attached to the underside of arm 23; the spring 27 being wound around the pin 26 to tension it. It will be noted that the hexagonal head of the pin 26 is held against rotation by means of the hexagonal recess on the arm 25 wherein said pin is inserted. A flexible current conducting wire 30 connects the shoe 22 with the depending lug 18.

From the above description and the illustrative disclosure, it will be seen that a contact shoe is provided for transmitting high tension currents, and if, due to any irregularities in the trolley wire, such as switches, cross-overs, curves or the like, the main shoe is momentarily disengaged from the trolley wire, the follower shoe will continue to make connection therewith, and there will be no break in the line of current. The same will be true if the main shoe is totally displaced from the trolley wire, for the follower shoe will maintain its contact with the wire. By providing the roatable harp and mounting the main shoe and the follower shoe in the manner disclosed, the device adapts itself to the various structural irregularities found in the trolley wire or rod. The shoes not only swing upon the harp, but also have movements independent of the harp and of each other relative to the wire or rod so that likelihood of complete disengagement and cutting off of current is practically eliminated.

It is understood that the invention is subject to various forms and modifications without departing from the scope of the appended claims.

I claim:

1. In a trolley, a rotatable harp, supporting means therefor, a trolley shoe mounted for oscillation therein, and a second trolley shoe connected therewith.

2. In a trolley, a rotatable harp, supporting means therefor, a trolley shoe mounted for oscillation therein, a second trolley shoe connected therewith and means to exert pressure against said second trolley shoe.

3. In a trolley, a rotatable harp, supporting means therefor, a trolley shoe mounted for oscillation therein, an arm extending from said harp, a second trolley shoe mounted on said arm, and means to exert pressure against said second trolley shoe.

4. In a trolley, a rotatable harp, supporting means therefor, a trolley shoe mounted for oscillation therein, an arm extending from and movably connected to said harp, a second trolley shoe mounted on said arm, and means to exert pressure against said second trolley shoe.

5. In a trolley, a rotatable harp, supporting means therefor, a trolley shoe comprising a flat surface with flanges on two sides mounted therein, an arm extending from and movably connected to said harp, a second trolley shoe mounted on said arm and means to exert pressure against said second trolley shoe.

6. In a trolley, a rotatable harp, supporting means therefor, a trolley shoe comprising a flat surface with flanges on two sides mounted for limited movement therein, an arm extending from and movably connected to said harp, a second trolley shoe mounted on said arm, and means to exert pressure against said second trolley shoe.

7. In a trolley, a rotatable harp, supporting means therefor, a trolley shoe movable therein, an arm extending from and movably connected to said harp, a second trolley shoe mounted on said arm, a second arm extending from said harp, and means between said arms to exert pressure against said second trolley shoe.

8. In a trolley, a rotatable harp, supporting means therefor, a trolley shoe movable therein, an arm extending from and movably connected to said harp, a second trolley shoe mounted on said arm, a second arm extending from said harp below said first named arm, and a spring secured to said second arm and exerting pressure against said first named arm.

9. In a trolley, a supporting member, a split bracket having apertures near its ends rotatably mounted thereon, a sleeve extending through said apertures, a trolley shoe mounted on said sleeve, an arm movably mounted on said sleeve, a second trolley shoe mounted on said arm, a second arm extending from and forming part of said bracket, and means between said arms to exert pressure against said second trolley shoe.

10. In a trolley, a supporting member, a split bracket having apertures near its ends rotatably mounted thereon, a sleeve extending through said apertures, a trolley shoe mounted on said sleeve, an arm movably mounted on said sleeve, a second trolley shoe mounted on said arm, a second arm extending from and forming part of said bracket, and a spring secured to said second arm and exerting pressure against said first named arm.

11. In a trolley, a harp mounted for rotation about a substantially vertical pivot, a main contact shoe pivotally mounted in said harp, a carrier arm pivotally mounted on said harp for independent movement, and a second contact shoe carried by said arm.

12. In a trolley, the combination of a pivotally mounted harp, a main contact shoe mounted for limited pivotal movement in said harp, an arm pivotally mounted on said harp with its axis coincident with that of said main shoe, a second contact shoe carried by said arm, and means carried by said harp tending to maintain said second shoe always in contact with the trolley wire or rod.

13. In a trolley, a pivotally mounted harp, a main contact shoe pivotally mounted in said harp for limited pivotal movement, a carrier arm having supporting members mounted on the same pivot as said main shoe but movable independently thereof, a second shoe mounted on said arm, and resilient means carried by said harp and engaging said arm to maintain said second shoe always in contact with the trolley wire or rod.

14. In a trolley, a harp, supporting means therefor, a trolley shoe mounted for oscillation therein, and a second trolley shoe connected therewith.

15. In a trolley, a harp, supporting means therefor, a trolley shoe mounted for oscillation in a substantially longitudinal plane therein, and a second trolley shoe connected therewith.

In testimony whereof I have hereunto set my hand.

FREDERICK C. COSEO.